United States Patent [19]

Ragir et al.

[11] 4,025,258
[45] May 24, 1977

[54] APPARATUS FOR FORMING SUPPORT DEVICE

[75] Inventors: Meyer J. Ragir, Highland Park; George R. Olen, Chicago, both of Ill.

[73] Assignee: Meyer J. Ragir, Highland Park, Ill.

[22] Filed: Sept. 10, 1975

[21] Appl. No.: 612,194

Related U.S. Application Data

[60] Continuation of Ser. No. 443,993, Feb. 20, 1974, abandoned, which is a division of Ser. No. 93,526, Oct. 30, 1970, abandoned.

[52] U.S. Cl. .............................. 425/123; 425/127; 425/129 R
[51] Int. Cl.² ...................... B29C 6/04; B29F 1/10
[58] Field of Search ........... 425/127, 126 R, 129 R, 425/122, DIG. 210, 123

[56] References Cited

UNITED STATES PATENTS

| | | | |
|---|---|---|---|
| 2,811,744 | 11/1957 | Baldanza | 425/127 |
| 3,427,688 | 2/1969 | Wilson | 425/127 |
| 3,674,391 | 7/1972 | Welle | 425/DIG. 210 |
| 3,743,458 | 7/1973 | Hallaner | 425/122 |

*Primary Examiner*—Richard B. Lazarus
*Assistant Examiner*—William R. Briggs
*Attorney, Agent, or Firm*—Dressler, Goldsmith, Clement, Gordon & Shore, Ltd.

[57] ABSTRACT

An apparatus and method for making a support device, typically of synthetic plastic material, in which fibrous backing members are concurrently cut, positioned, and bonded to the support device as it is formed. In an injection molding machine, a punch and die assembly cuts the backing members from a strip of fibrous material and automatically positions the members adjacent one side of the mold cavity. Molten plastic material is injected into the mold cavity and forms the support device while simultaneously adhering to the fibrous backing members. The completed support device has a body portion with load carrying members projecting from the forward surface thereof. The fibrous backing members are molded directly onto the rear surface of the body portion and a coating of adhesive material is placed on the outer surface of the fibrous backing members for securing the completed support device to a surface such as a wall or door.

2 Claims, 15 Drawing Figures

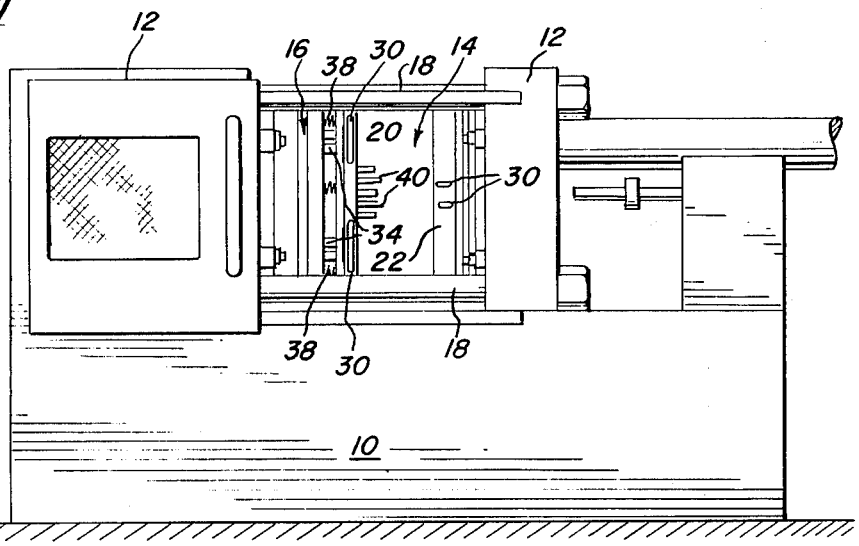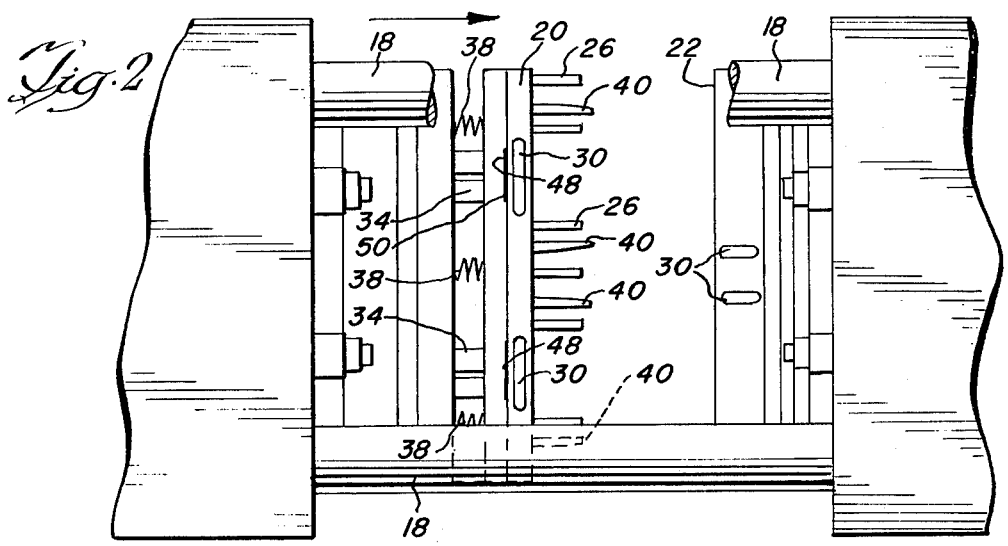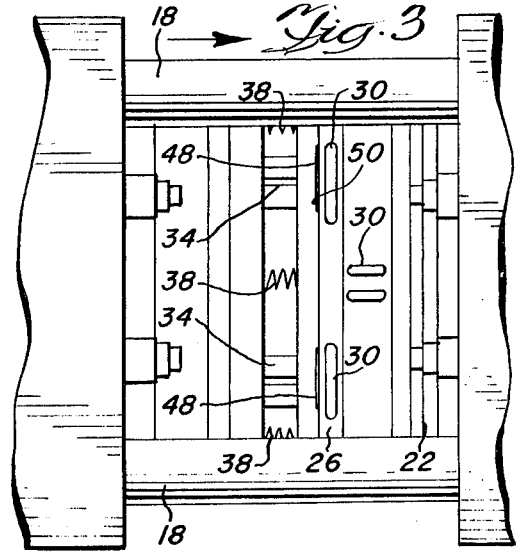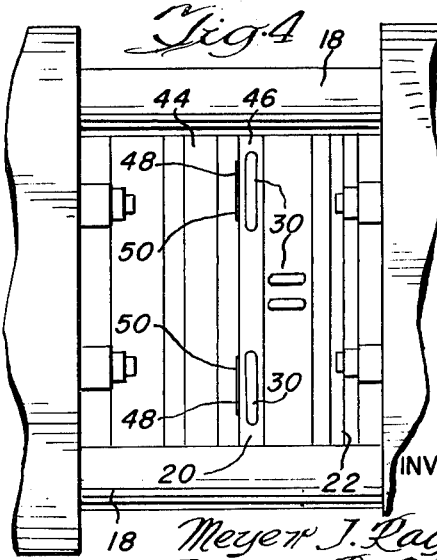

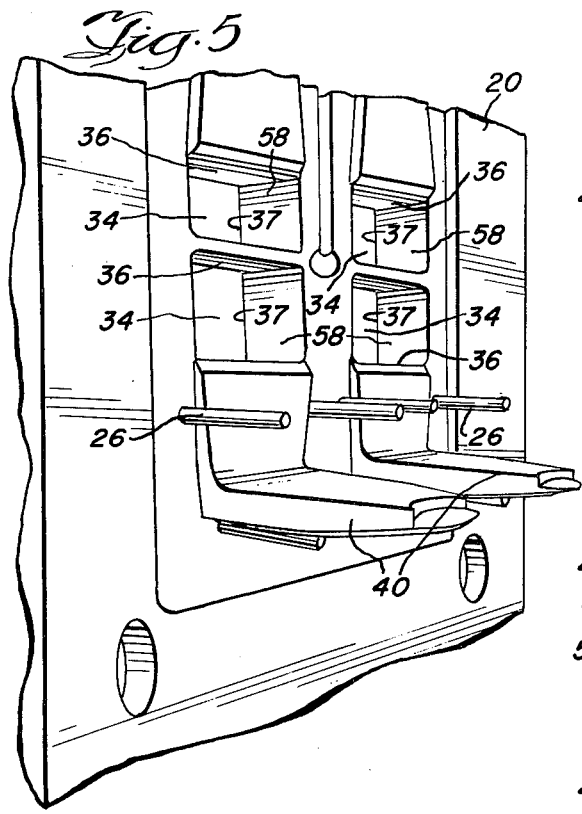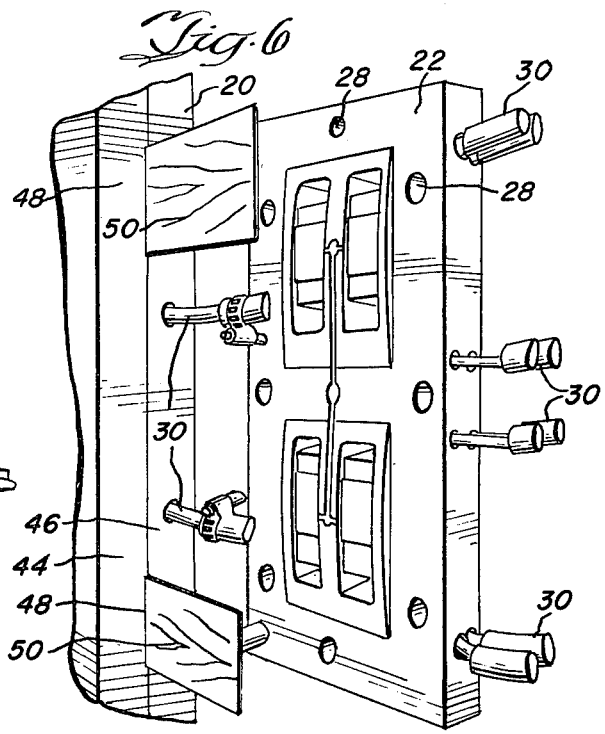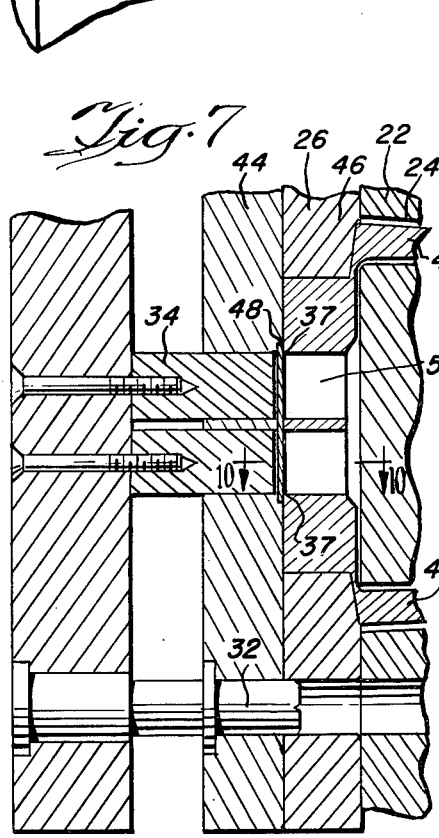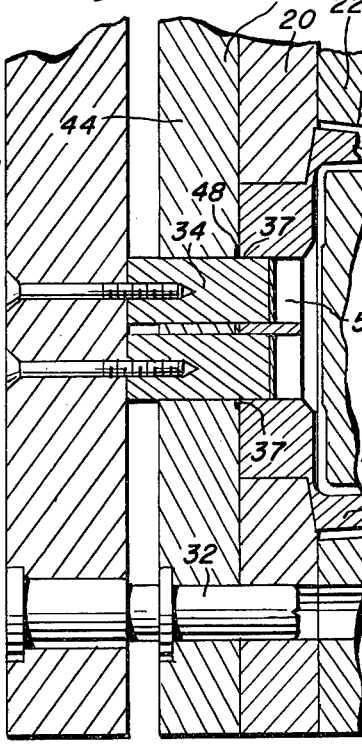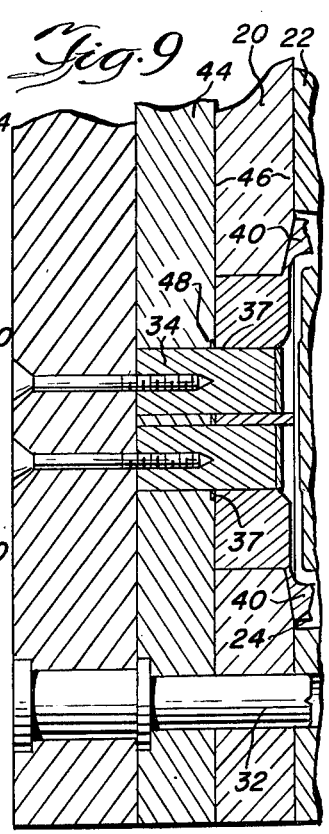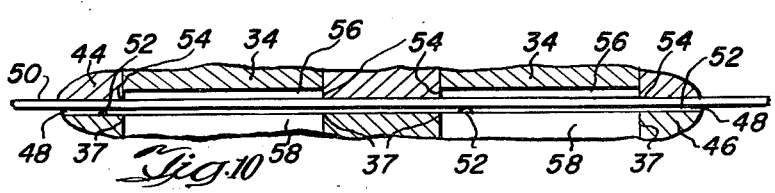

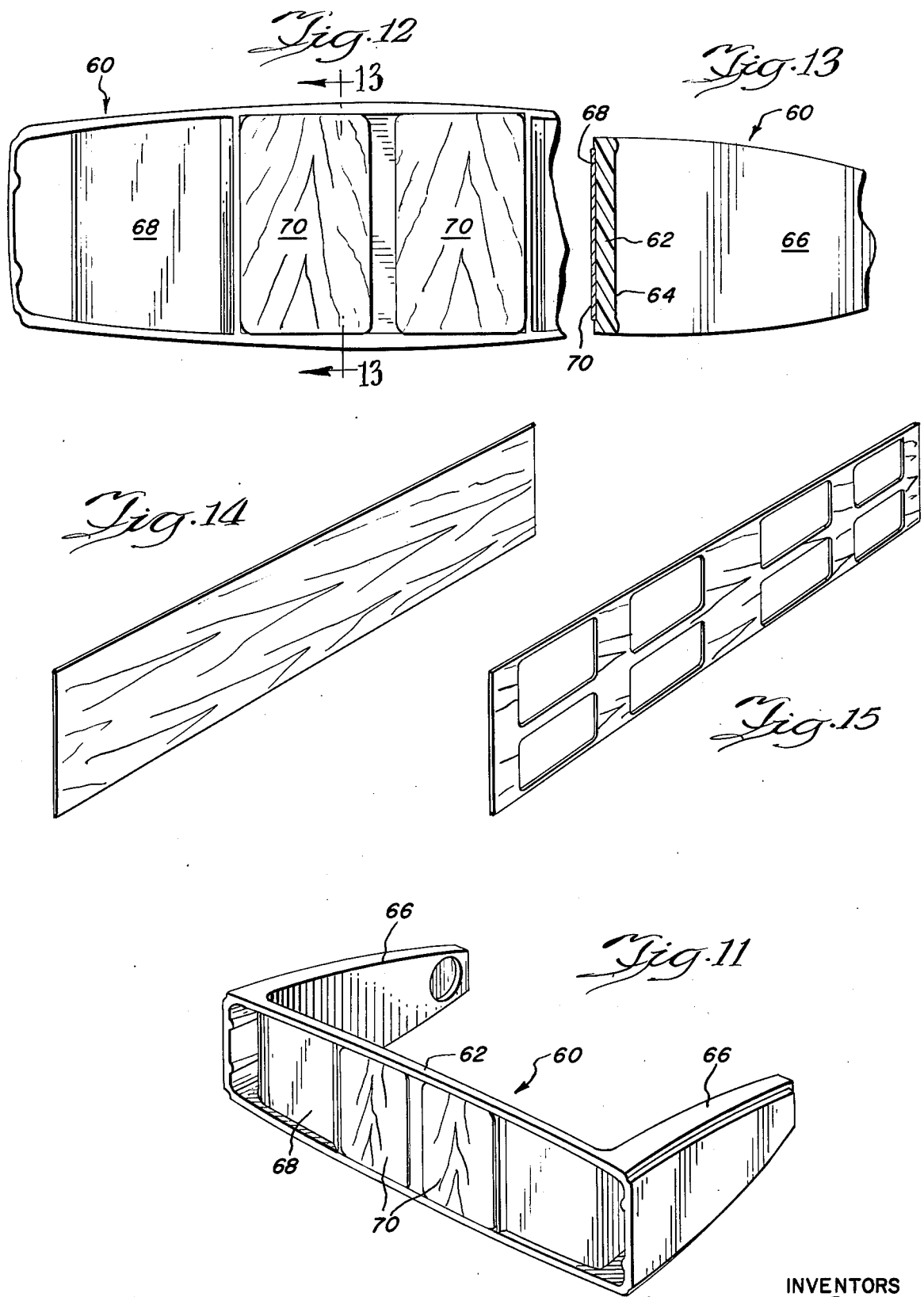

APPARATUS FOR FORMING SUPPORT DEVICE

This is a continuation, of application Ser. No. 443,993, filed Feb. 20, 1974 now abandoned, which was a division of application Ser. No. 93,526 filed Oct. 30, 1970 now abandoned.

BACKGROUND OF THE INVENTION

In the past, numerous load carrying support devices have been provided which were designed to be directly mounted on surfaces such as walls or doors and retained there by adhesive material. Examples of such devices are found in U.S. Pat. No. 3,504,878 issued to M. Dressler on Apr. 7, 1970.

The prior art structures were usually made by forming the support device in the conventional injection molding machine after pre-cut fibrous backing members or insert pieces have been hand placed in the injection molding machine. Such pre-cut insert pieces were positioned adjacent the mold cavity and directly bonded by adhesion of the molten synthetic material to at least one surface of the fibrous insert. As an alternative, a surface of the fibrous backing member was bonded to a surface of the support device by a separate manual step in which adhesive material was applied to the mating surfaces and such surfaces were placed in contact after the molding operation was completed.

Regardless of the method utilized in securing the fibrous inserts or backing members, the prior practices have been costly, time consuming, and tedious; employing hand labor to accurately manipulate and position the cut insert member prior to bonding them to the appropriate surface of the molded support device.

Furthermore, manual manipulation of the fibrous inserts or backing members has limited the minimum size of fibrous pieces that could be efficiently handled. Such limitations correspondingly have restricted the minimum size of the resulting article of product to which the insert could be bonded. In other words, as the size of the fibrous inserts is made smaller to allow for smaller sizes of support devices, it has become increasingly difficult to handle the inserts and accurately place them on the finished product.

To insure a quality product which can sustain the load subjected to the load carrying members, it is desirable to cover as much rear surfaces of the support device with fibrous materials as possible to provide the maximum bonding area to the wall surface. However, as the size of the inserts is increased to accomplish this objective, such fibrous pieces are subject to warpage.

Thus, there is a need for a sequential automatic machine operation which would mold a support device and concurrently cut, position and bond the fibrous backing material thereto. As greater surface bonding area is required for adhesion to a wall or the like, a plurality of individual small backing members or inserts can be utilized to accomplish this objective without warpage which has been encountered in the past.

SUMMARY OF THE INVENTION

In accordance with the present invention, there is provided an injection molding machine having a male die portion or mold member and a female die portion or mold member which are brought into registry to form a mold cavity to receive molten plastic material and form a support device. Secured to one of the molding die portions is a punch and die arrangement for cutting insert pieces from a strip of fibrous material and for positioning such inserts adjacent one side of the molding cavity immediately prior to the molding and forming process. As the molten synthetic material fills the molding cavity it simultaneously bonds the fibrous insert material and secures it to the finished product. After the support device is removed from the injection molding machine adhesive material is applied to the outer surface of the fibrous backing material. It should be understood that such adhesive material could be pre-applied to the strip of fibrous material prior to inserting such material into the injection molding machine.

Thus, it is a feature of the present invention to provide a concurrent process utilizing a single machine to automatically complete the manufacture of support devices without interrupting the machine sequential operation. A method of manufacture is provided in which the basic materials are initially placed in the machine and the articles are produced without stopping the forming process to hand fit, position, or otherwise manually contribute to the machine operation or article production.

The novel apparatus combines a molding or forming die assembly with a punch and cutting die arrangement to accurately cut and piece one or more fibrous backing members in the molding cavity. It provides the ability to manufacture a more extensive range of sizes of molded articles. It furthermore overcomes the prior difficulty of hand positioning small insert pieces. As larger sizes of articles are required to increase the required surface adhesion area, a multiplicity of insert pieces may be provided on the molded article and thereby overcome the inherent warpage present in the use of large single fibrous backing members.

Numerous other advantages and features of the present invention will become readily apparent from the following detailed description and claims taken in conjunction with the accompanying drawings which show the preferred embodiment. Other embodiments of the invention employing the same or equivalent principles may be used and structural changes may be made by those skilled in the art without departing from the present invention.

DESCRIPTION OF THE DRAWINGS

FIG. 1 is a side elevational view of an injection molding machine including the punch and die apparatus for cutting and positioning fibrous backing members;

FIG. 2 is an enlarged fragmentary side view of a portion of the injection molding machine shown in FIG. 1, with the molding mechanism in an open position prior to the initiation of the forming process;

FIG. 3 is an enlarged fragmentary side view illustrating the mechanism shown in FIG. 2 in a second position with the molding mechanism in a closed position and prior to the fibrous backing members being cut and positioned adjacent the mold cavity;

FIG. 4 is an enlarged fragmentary side view illustrating the mechanism shown in FIG. 2 in a third position in which the molding mechanism is in a closed position and the punch and die apparatus for the fibrous backing members has completed its function and the support device is being formed;

FIG. 5 is a perspective view of one portion of the molding mechanism illustrating the male die mold member and the punch and die apparatus for the fibrous backing members;

FIG. 6 is a perspective view of the molding mechanism and illustrating in particular the female die mold member;

FIG. 7 is a vertical sectional view of the male die mold member of the molding mechanism shown in FIG. 2 with the fibrous backing member punch and die apparatus in position immediately prior to cutting the backing members or inserts from the strip of fibrous materials;

FIG. 8 is a vertical sectional view of the support prior to the final positioning of the backing members on one side of the mode cavity;

FIG. 9 is a vertical sectional view of the support device molding mechanism shown in FIG. 4 with the backing members or inserts positioned on one side of the mold cavity and the support device being formed;

FIG. 10 is a fragmentary horizontal sectional view of the punch and die apparatus taken on lines 10'10 of FIG. 7;

FIG. 11 is a perspective view of one type of molded support device formed by the injection molding machine embodying the present invention;

FIG. 12 is a fragmentary rear elevational view of the molded support device illustrated in FIG. 11;

FIG. 13 is a vertical sectional view of the molded support device taken on lines 13—13 of FIG. 12;

FIG. 14 is a perspective view of a strip of fibrous backing member material used in conjunction with the punch and die apparatus; and FIG. 15 is a perspective view of the fibrous backing member material shown in FIG. 14 with a plurality of insert members cut therefrom.

DESCRIPTION OF PREFERRED EMBODIMENT

The preferred embodiment of the present invention is shown in FIGS. 1-6 as an injection molding machine combined with a punch and cutting die apparatus. The reference numeral 10 indicates generally a conventional molding machine which has a frame 12 that supports an injection mold 14 and a punch and cutting die mechanism 16. The frame 12 is provided with suitable slides or track members 18 that guide the advancement of a male molding die member 20 into registry with a female molding die member 22 to form a molding cavity 24. The advancemennt and retraction of the male die mold member 20 in relation to the female die mold member 22 is controlled by any suitable power means (not shown) working in conjunction with a conventional sequential control means (not shown). A number of pilot pins 26 project from the face of the male die mold member 20 and register with apertures 28 in the female die mold member 22 to insure proper alignment of the molding die members 20 and 22 when they are brought into registry. The male die mold member 20 and the female die mold member 22 are provided with suitable fluid conduits 30 which are connected to a source of molten plastic material. The molten plastic material is supplied by any suitable means under pressure to fill the molding cavity 24 during the article forming process.

As seen in FIGS. 7, 8 and 9, the punch and cutting die 16 in the illustrated embodiment is supported on the molding die male member 20 and provided with guide means 32 to insure alignment of the punch 34 with the cutting die 36 when actuated against compression springs 38 (see FIGS. 2, 3 and 4). The actuation of punch and die arrangement 16 is provided by any suitable means (not shown) and operated in timed relationship with the power means for advancing the male die portion 20 into registry with the female die portion 22 as previously discussed.

In FIGS. 5 and 6 it will be seen that the male die mold member 20 is provided with forming projections 40 to form one or more support devices during a single cycle of operation of the machine. The female die mold member 22 has a plurality of openings 42 to receive the projections 40 when the molding die 14 is closed thus forming the moldng cavity 24. Each die 36 in the present embodiment has rectangularly shaped sharp cutting edges 37.

In FIGS. 6, 7, 8 and 9, it will be seen that between upstanding support plates 44 and 46 which support the cutting dies 36 and the male molding die portion 20 thereof are transversely extending slots 48. Each slot 48 aligns with one or more pairs of vertically disposed cutting dies 36 to provide for insertion and orientation of a fibrous strip of material 50 and to arrange for positioning the strip 50 in relation to the cutting edges 37. Each fibrous strip 50 is insertable in a slot 48 and is both vertically and transversely positionable in relation to the cutting dies 36 and the respective cutting edges.

In the present embodiment, as seen in FIG. 10, the transverse slot 48 is somewhat wider than the thickness of the fibrous strip 50. A series of small protuberances, such as raised members or small leaf springs 52 extend into the slot 48 and are arranged on one side thereof to bias or hold the strip 50 to the opposite side of the slot 48. In other words, the protuberances 52 are adjacent the cutting die 36 and its cutting edges 37 and the fibrous strip 50 is pushed to the opposite side of the slot 48 adjacent the punch members 34. It will be noted that the corners 54 of the punch guide 56 are round while the edges 37 of the cutting die 36 are sharp. The object of this relationship will be explained hereinafter. The cutting die 36 is provided with guide or passage 58 which aligns with punch guide 56 to provide co-extensive support for the punch members 34 during its operation.

In FIGS. 11-15 the construction and materials for the completed support device 60 are shown. The support device 60 has a body portion 62 provided with a forward surface 64 and a pair of load carrying hollow arms 66 projecting therefrom at each end of the body portion 62. The rear surface 68 has a generally planar area and a pair of fibrous backing members 70 are bonded thereto. These backing members 70 are cut from the strip of fibrous material 50 which in the present invention is wood. The strip of fibrous material 50 can be of any similar fibrous material capable of receiving an adhesive such as a water soluble glue which is readily adaptable for use in mounting and securing the completed support device 60 to a surface such as a wall or a door.

As previously mentioned, the type of article formed by the novel process and apparatus of the present invention is similar to the article shown and described in U.S. Pat. No. 3,504,878.

The operation of the preferred embodiment of the present invention is initiated with the molding die assembly in the position shown in FIGS. 1 and 2. The strips of fibrous material 50 are inserted in the transverse slots 48 formed between the upstanding support plates 44 and 46 and pushed through the slot 48 until aligned with the punch members 34 and the corresponding cutting die members 36 of the punch and cutting die assembly 16. As will be seen in FIG. 5, four such punch and cutting die arrangements are positioned adjacent one another in order to operate on a single strip of fibrous material 50 and cut it as shown in FIG. 15.

The assembly of the punch and cutting die 16 and the male molding die member 20 is advanced along the guides or tracks 18 by a power means into registry with the female die mold member 22 to form the molding die cavity 24. When this operation is completed, the various elements forming the assembly will be in the position shown in FIGS. 3 and 7. The next step occurs as the punch and cutting die 16 continues to advance against springs 38 and the punch 34 engages the fibrous strip 50 pressing it against the cutting edges 37 of the die 36 and passing therethrough into the die 36. By this action, the fibrous inserts 70 are cut from the strip 50.

As seen in FIG. 10 and previously mentioned, the corners 54 are rounded while the corners of the cutting die 37 are sharp. The protuberances 52 bias the strip of fibrous material 50 to the rear side of the slot 48 at all times except during the cutting operation at which time the punch 34 pushes the strip of fibrous material 50 against the sharp corners 37 to obtain a sharp clean cut of the insert or backing member 70 as the punch 34 passes through the strip 50. The object of the rounded corners 54 and the protuberances 52 is to provide for the ease of sliding the cut strip 50 from the punch and cutting die 16 after the entire operation. With various types of fibrous materials it is possible that the cut strip 50 could hang up and interfere on the sharp corners 37 and obstruct the passage of the cut strip 50 from the slot 48. The rounded corners 54 and the protuberances 52 cooperate to provide a nonobstructed passage of the strip 50 through the die slot 48 by biasing the strip 50 to the rear side of the slot 48 before and after the cutting operation.

The punch 34 continues to pass through the strip 50 and into the guide or passage 58 to push the inserts 70 forwardly into registry with one side of the molding cavity 24, as will be seen in FIGS. 8 and 9. When the cutting and punch die 16 has reached the position shown in FIGS. 4 and 9 where the punch 34 is in its completely extended position in the passage 58, inserts 70 are positioned on one side of the mold cavity 24 for the molding operation of the support device 60.

Molten plastic material is introduced under pressure into the die cavity 24 and as the material fills the die cavity 24 it adheres and directly bonds the forward side of the fibrous insert members 70 as well as a portion of the periphery of the backing member (see FIG. 13) and secures them thereto without the need of additional adhesive material. After this operation is completed, the male molding die member 20 and the punch and cutting die 16 is retracted from the female molding die member 22 to the positions shown in FIGS. 1 and 2 and the completed support device 60 is taken from the injection molding machine.

A layer of adhesive material on the rear or outer surface of the insert members 70 is utilized to provide for adhesion to a flat surface when attaching a completed support device 60 to a wall, door or similar flat surface. This adhesive is usually a moisture softened material and is well known to the art. The adhesive material can be applied by various conventional expedients after the molded support device is removed from the machine. Alternatively, the entire strip 50 or portions thereof can be coated with such adhesive material prior to inserting it into the slot 48, thus eliminating the previously mentioned final step of covering the backing member 70 after the support device 68 has been molded.

Regardless of the manner of applying adhesive materials to the completed project, the aforementioned process provides for a method of manufacturing a convenient and useful support device without interrupting the sequential machine steps, thereby allowing for continuous operation of the molding machine. It eliminates the costly and time consuming hand positioning and orienting operation required by prior methods. Furthermore, automation of the entire process can be further enhanced by utilizing a continuous roll of fibrous material in place of fixed length strips as seen in FIG. 14. Such continuous roll of material could be concurrently fed in timed relation with the other machine elements. In other words, the entire operation can be sequentially operated to feed a continuous roll of strip material through the slots 48 upon each retraction of the male die assembly 20 at the end of the forming cycle.

Accordingly, this method provides a direct and permanent connection or bond of one or more fibrous backing members to a molded article which will withstand substantial forces applied thereto during the use of the support device when it is secured to a wall surface. Such backing members can be relatively small and a multiplicity of such small members can be automatically cut and positioned and bonded to a molded article when large surface areas of fibrous backing material are required to increase the adhesive surface or area of the article bonded to the wall surface. A multiplicity of the small backing members provides for maximum adhesion and holding power of the support device without the inherent warpage which is a characteristic disadvantage by utilizing a large single fibrous piece in an effort to obtain the same holding power.

As will be readily observed from the forgoing detailed description of the invention and the illustrated embodiments thereof, there are numerous variations and modifications which may be effected without departing from the true spirit and scope of the novel concepts and principles of this invention.

What is claimed is:

1. Apparatus for making a molded article having a wooden backing member bonded thereto comprising an injection molding machine having a molding die assembly including a male die portion and a female die portion, a punch and die mechanism supported on one of said molding die portions, means moving said male and female die portions into registry with one another to form a mold-defining cavity therebetween, said punch and die mechanism including cooperative punch means and cutting edge means in alignment with said mold-defining cavity, a supply of wooden backing material, means supporting and aligning said wooden backing material between said punch means and said cutting edge including slot means extending through said one molding die portion, said slot means being wider than the thickness of said wooden backing material, and means normally biasing said wooden backing material away from said cutting edge and towards said punch means. said die moving means including means advancing said punch means towards said closed cavity to sever a portion from said backing material to form a backing member and to advance said backing member towards and support said backing member along only a portion of the periphery of one wall of said mold-defining cavity, and means to feed molten material into said mold defining cavity to fill said cavity, whereby said molded article is formed and said wooden backing member is adhered thereto.

2. Apparatus as claimed in claim 1 including a plurality of said punch and die mechanisms supported in said one die portion, whereby a plurality of wooden backing members are severed from said wooden backing material and supported along the periphery of said mold-defining cavity.

* * * * *

UNITED STATES PATENT AND TRADEMARK OFFICE
CERTIFICATE OF CORRECTION

PATENT NO. : 4,025,258
DATED : May 24, 1977
INVENTOR(S) : Meyer J. Ragir and George R. Olen It is certified that error appears in the above-identified patent and that said Letters Patent are hereby corrected as shown below:

Column 3, line 10, delete "support" and insert --molding mechanism shown in FIGURE 3 with the punch and die apparatus in position after cutting the backing members and--.

Column 3, line 12, "mode" should be --mold--.

Column 3, line 18, "10'10" should be --10-10--.

Column 3, line 45, "advancemennt" should be --advancement--.

Column 6, line 5, "project" should be --product--.

Column 6, line 63, the period "." should be a comma --,--.

Signed and Sealed this second Day of August 1977

[SEAL]

Attest:

RUTH C. MASON
Attesting Officer

C. MARSHALL DANN
Commissioner of Patents and Trademarks